US012563207B2

(12) United States Patent　　　(10) Patent No.:　US 12,563,207 B2
　　Choi et al.　　　　　　　　　　(45) Date of Patent:　　　Feb. 24, 2026

(54) METHOD AND APPARATUS FOR GENERATING RESIDUAL SIGNALS USING REFERENCE BETWEEN COMPONENTS

(71) Applicants:HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Han Sol Choi, Dongducheon-si (KR); Jun Taek Park, Seoul (KR); Dong Gyu Sim, Seoul (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 172 days.

(21) Appl. No.: 18/197,823

(22) Filed: May 16, 2023

(65) Prior Publication Data

US 2023/0291914 A1　　Sep. 14, 2023

Related U.S. Application Data

(63) Continuation　of　application　No. PCT/KR2021/017377, filed on Nov. 24, 2021.

(30) Foreign Application Priority Data

Nov. 24, 2020　(KR) ......................... 10-2020-0158993
Nov. 24, 2021　(KR) ......................... 10-2021-0163120

(51) Int. Cl.
　　*H04N 19/186*　　(2014.01)
　　*H04N 19/154*　　(2014.01)
　　*H04N 19/176*　　(2014.01)

(52) U.S. Cl.
　　CPC ......... *H04N 19/186* (2014.11); *H04N 19/154* (2014.11); *H04N 19/176* (2014.11)

(58) Field of Classification Search
　　CPC .. H04N 19/186; H04N 19/154; H04N 19/176; H04N 19/11; H04N 19/124;

(Continued)

(56) References Cited

U.S. PATENT DOCUMENTS 8,942,284　B2　1/2015　Oh et al.
9,325,995　B2　4/2016　Oh et al.

(Continued)

FOREIGN PATENT DOCUMENTS

KR　20140088099　A　7/2014
KR　20170107448　A　9/2017

(Continued)

*Primary Examiner* — Maria E Vazquez Colon
(74) *Attorney, Agent, or Firm* — Lempia Summerfield Katz LLC

(57) ABSTRACT

The present disclosure is related to a method and an apparatus for generating residual signals using reference between components. The video encoding/decoding apparatus and method derive residual signals of a chroma component of a current block. In deriving the residual signals of the chroma component, the video encoding/decoding apparatus and method use the residual signals of a previously reconstructed block without transmitting residual signals of part of the chroma component of the current block.

11 Claims, 14 Drawing Sheets

(58) Field of Classification Search
CPC .... H04N 19/13; H04N 19/132; H04N 19/105; H04N 19/593; H04N 19/60; H04N 19/61; H04N 19/70
See application file for complete search history.

(56) References Cited

U.S. PATENT DOCUMENTS

| | | | |
|---|---|---|---|
| 9,392,287 B2 | 7/2016 | Oh et al. | |
| 9,402,078 B2 | 7/2016 | Oh et al. | |
| 9,445,100 B2 | 9/2016 | Oh et al. | |
| 9,918,097 B2 | 3/2018 | Oh et al. | |
| 9,998,742 B2 | 6/2018 | Chen et al. | |
| 10,334,257 B2 | 6/2019 | Oh et al. | |
| 10,880,559 B2 | 12/2020 | Oh et al. | |
| 11,070,824 B2 | 7/2021 | Tsukuba | |
| 2014/0254677 A1 | 9/2014 | Oh et al. | |
| 2015/0063448 A1 | 3/2015 | Oh et al. | |
| 2015/0098501 A1 | 4/2015 | Oh et al. | |
| 2015/0098502 A1 | 4/2015 | Oh et al. | |
| 2015/0103891 A1 | 4/2015 | Oh et al. | |
| 2016/0219283 A1* | 7/2016 | Chen | H04N 19/105 |
| 2016/0345016 A1 | 11/2016 | Oh et al. | |
| 2018/0160130 A1 | 6/2018 | Oh et al. | |
| 2019/0306518 A1 | 10/2019 | Oh et al. | |
| 2021/0092413 A1 | 3/2021 | Tsukuba | |
| 2021/0281864 A1 | 9/2021 | Tsukuba | |
| 2022/0182633 A1 | 6/2022 | Lin et al. | |
| 2022/0279169 A1 | 9/2022 | Deng et al. | |

FOREIGN PATENT DOCUMENTS

| | | | |
|---|---|---|---|
| KR | 20200051596 A | 5/2020 | |
| KR | 2653562 B1 * | 4/2024 | H04N 19/105 |
| WO | 2020187161 A1 | 9/2020 | |
| WO | 2020216246 A1 | 10/2020 | |

* cited by examiner

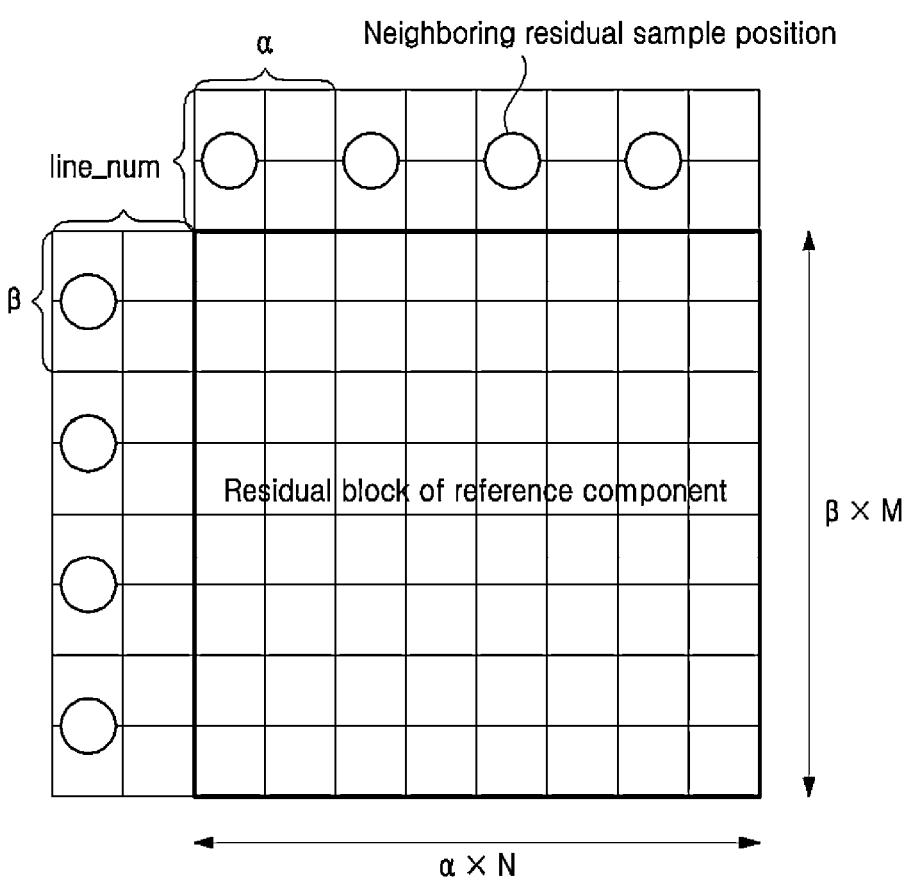
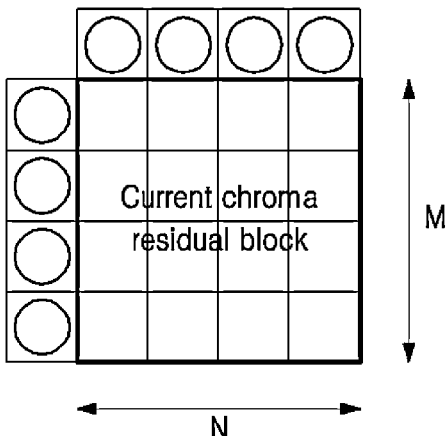
*FIG. 8B*

$$a = \frac{L \cdot \Sigma(Y(\iota) \cdot X(\iota)) - \Sigma Y(\iota) \cdot \Sigma X(\iota)}{L \cdot \Sigma(Y(\iota) \cdot Y(\iota)) - \Sigma Y(\iota) \cdot \Sigma Y(\iota)}$$

$$b = \frac{\Sigma Y(\iota) - a \cdot \Sigma X(\iota)}{L}$$

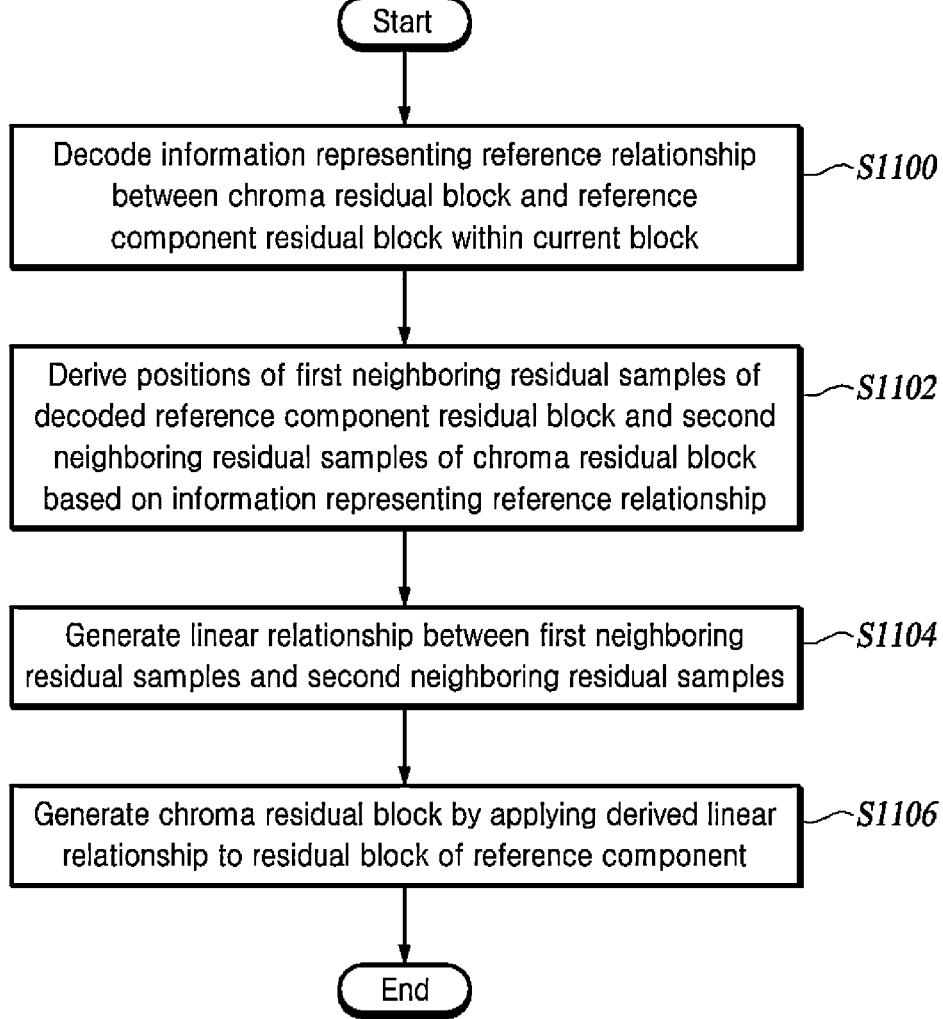

Start

Decode information representing reference relationship between chroma residual block and reference component residual block within current block — _S1100_

Derive positions of first neighboring residual samples of decoded reference component residual block and second neighboring residual samples of chroma residual block based on information representing reference relationship — _S1102_

Generate linear relationship between first neighboring residual samples and second neighboring residual samples — _S1104_

Generate chroma residual block by applying derived linear relationship to residual block of reference component — _S1106_

End

*FIG. 11*

METHOD AND APPARATUS FOR GENERATING RESIDUAL SIGNALS USING REFERENCE BETWEEN COMPONENTS

CROSS-REFERENCE TO RELATED APPLICATIONS

This application is a Continuation of International Application No. PCT/KR2021/017377, filed on Nov. 24, 2021, which claims the benefit of and priority to Korean Patent Application No. 10-2020-0158993 filed on Nov. 24, 2020, and Korean Patent Application No. 10-2021-0163120 filed on Nov. 24, 2021, the entire disclosures of each of which are incorporated herein by reference.

TECHNICAL FIELD

The present disclosure in some embodiments relates to a method and an apparatus for generating residual signals using reference between components.

BACKGROUND

The statements in this section merely provide background information related to the present disclosure and do not necessarily constitute prior art.

Because video data has a large amount of data compared to audio or still image data, it requires a lot of hardware resources, including memory, to store or transmit the video data without processing for compression.

Accordingly, an encoder is generally used to compress and store or transmit video data; a decoder receives the compressed video data, decompresses the received compressed video data, and plays the decompressed video data. Video compression techniques include H.264/AVC, High Efficiency Video Coding (HEVC), and Versatile Video Coding (VVC). VCC has improved coding efficiency by about 30% or more compared to HEVC.

However, because the image size, resolution, and frame rate gradually increase, the amount of data to be encoded also increases. Accordingly, a new compression technique providing higher coding efficiency and an improved image enhancement effect than existing compression techniques is required.

In image (video) decoding, residual signals of Cb signals or Cr signals may be generated by cross-referencing to generate residual signals of a chroma component. The video decoding apparatus derives the residual signals of the Cr signals by multiplying the Cb residual signals by 1 or −1 after receiving the Cb residual signals or derives the residual signals of the Cb signals by multiplying the Cr residual signals by 1 or −1 after receiving the Cr residual signals, which is referred to as joint coding of chroma residuals (JCCR). As in JCCR, the residual signals of the chroma component may still be further exploited to enhance the compression ratio. Therefore, a method of effectively encoding and decoding residual signals of the chroma channel needs to be considered in terms of coding efficiency.

SUMMARY

Embodiments of the present disclosure provide a video encoding/decoding apparatus and a method for deriving residual signals of a chroma component of a current block. In deriving the residual signals of the chroma component, the video encoding/decoding apparatus and method use the residual signals of a previously reconstructed block without transmitting residual signals of part of the chroma component of the current block.

At least one aspect of the present disclosure provides a method for reconstructing a chroma residual block of a current block performed by a video decoding apparatus. The method comprises deriving positions of first neighboring residual samples of a reference component residual block and second neighboring residual samples of a chroma residual block based on information representing a reference relationship between the chroma residual block and a decoded reference component residual block within the current block. The method also comprises generating a linear relationship between the first neighboring residual samples and the second neighboring residual samples. The method also comprises generating the chroma residual block by applying the linear relationship to the reference component residual block.

Another aspect of the present disclosure provides a video decoding apparatus. The video decoding apparatus comprises an entropy decoder configured to decode information representing a reference relationship between a chroma residual block and a decoded reference component residual block within a current block. The video decoding apparatus also comprises a neighboring residual sample deriver configured to derive positions of first neighboring residual samples of the reference component residual block and second neighboring residual samples of the chroma residual block based on the information representing the reference relationship. The video decoding apparatus also comprises a linear model deriver configured to generate a linear relationship between the first neighboring residual samples and the second neighboring residual samples. The video decoding apparatus also comprises a residual signal generator configured to generate the chroma residual block by applying the linear relationship to the reference component residual block.

Yet another aspect of the present disclosure provides a method for reconstructing a chroma residual block of a current block performed by a video encoding apparatus. The method comprises generating information representing a reference relationship between the chroma residual block and a reference component residual block within the current block. The method also comprises deriving positions of first neighboring residual samples of the reference component residual block and second neighboring residual samples of the chroma residual block based on the information representing the reference relationship. The method also comprises generating a linear relationship between the first neighboring residual samples and the second neighboring residual samples. The method also comprises generating the chroma residual block by applying the linear relationship to the reference component residual block.

As described above, embodiments of the present disclosure provide a video encoding/decoding apparatus and a method that derive residual signals of a chroma component of a current block. In deriving the residual signals of the chroma component, the video encoding/decoding apparatus and method use the residual signals of a previously reconstructed block, thereby improving coding efficiency by not transmitting residual signals of part of the chroma component of the current block.

BRIEF DESCRIPTION OF THE DRAWINGS

FIGS. 8A and 8B illustrate positions of neighboring residual samples, according to an embodiment.

FIG. 11 is a flow diagram illustrating a method for reconstructing chroma residual signals performed by a video decoding apparatus, according to an embodiment.

DETAILED DESCRIPTION

Figure 1:
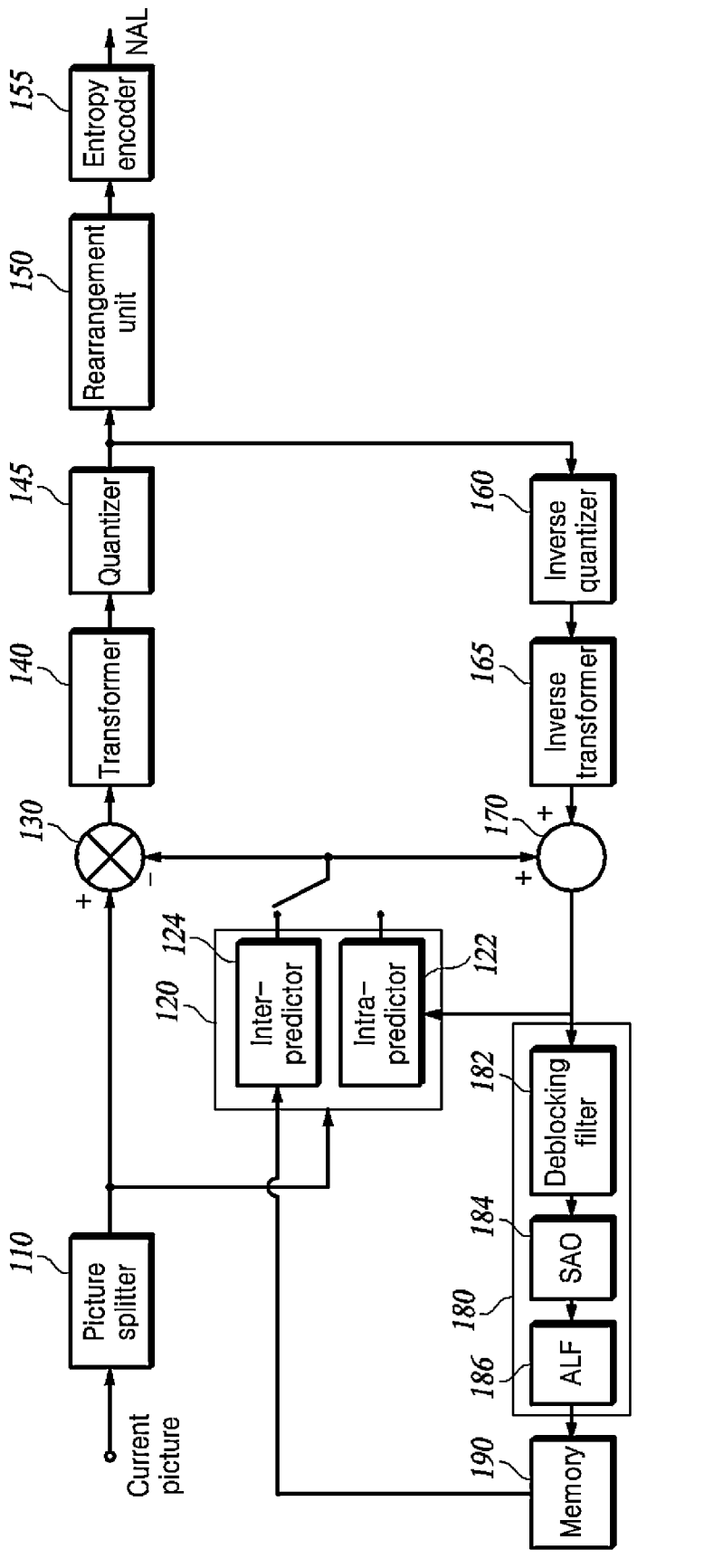
FIG. 1 is a block diagram of a video encoding apparatus that may implement the techniques of the present disclosure.

Hereinafter, embodiments of the present disclosure are described in detail with reference to the accompanying illustrative drawings. In the accompanying drawings, like reference numerals designate like elements even when the elements are shown in different drawings. Further, in the following description, detailed descriptions of related known components and functions may be omitted for the purpose of clarity and for brevity in order to not obscure the subject of the present disclosure.

FIG. 1 is a block diagram of a video encoding apparatus that may implement technologies of the present disclosure. Hereinafter, referring to FIG. 1, the video encoding apparatus and sub-components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Information commonly applied to all blocks in one slice is encoded as the syntax of a slice header, and information applied to all blocks constituting one or more pictures is encoded to a picture parameter set (PPS) or a picture header. Information commonly referred to by the plurality of pictures is encoded to a sequence parameter set (SPS). Information commonly referred to by one or more SPS is encoded to a video parameter set (VPS). Information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of CTU. Information on the size of the CTU (CTU size) is encoded as the syntax of the SPS or the PPS and delivered to a video decoding apparatus.

The picture splitter 110 splits each picture constituting the video into a plurality of CTUs having a predetermined size and recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
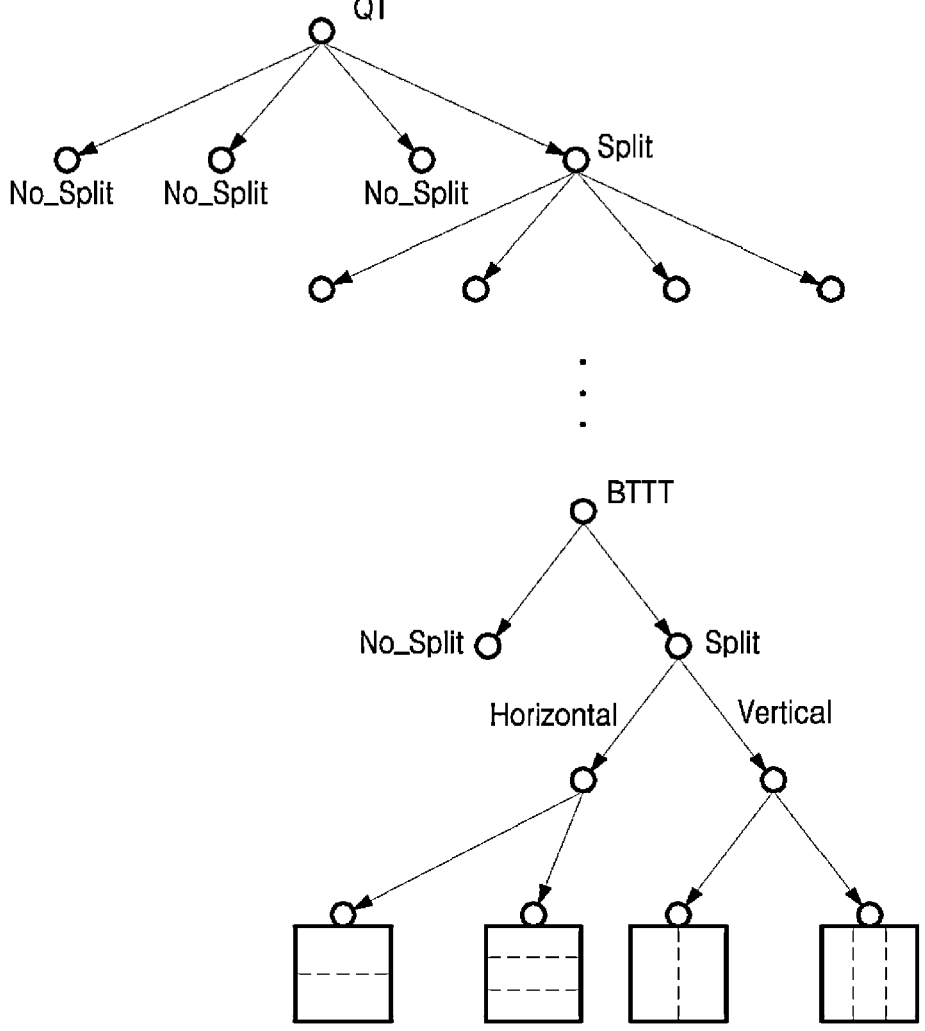
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, e.g., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, e.g., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. In an embodiment, a type in which the block of the corresponding node is split into two blocks of a form of being asymmetrical to each other may be additionally present. The asymmetrical form may include a form in which the block of the corresponding node split into two rectangular blocks having a size ratio of 1:3 and/or a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape or a square shape.

The predictor 120 predicts the current block to generate a prediction block. The predictor 120 includes an intra predictor 122 and an inter predictor 124.

In an embodiment, each of the current blocks in the picture may be predictively coded. In an embodiment, the prediction of the current block may be performed by using an intra prediction technology (using data from the picture including the current block) or an inter prediction technology (using data from a picture coded before the picture including the current block). The inter prediction may include unidirectional prediction and/or bidirectional prediction.

Figure 3A:
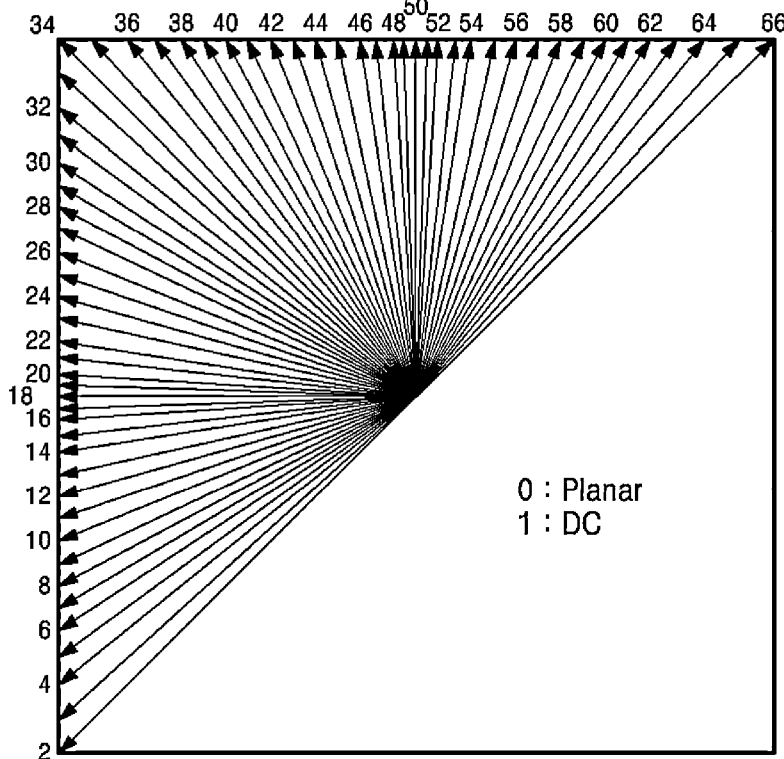
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a planar mode and a DC mode and may include 65 directional modes. A neighboring pixel and an arithmetic equation to be used are defined differently according to each prediction mode.

Figure 3B:
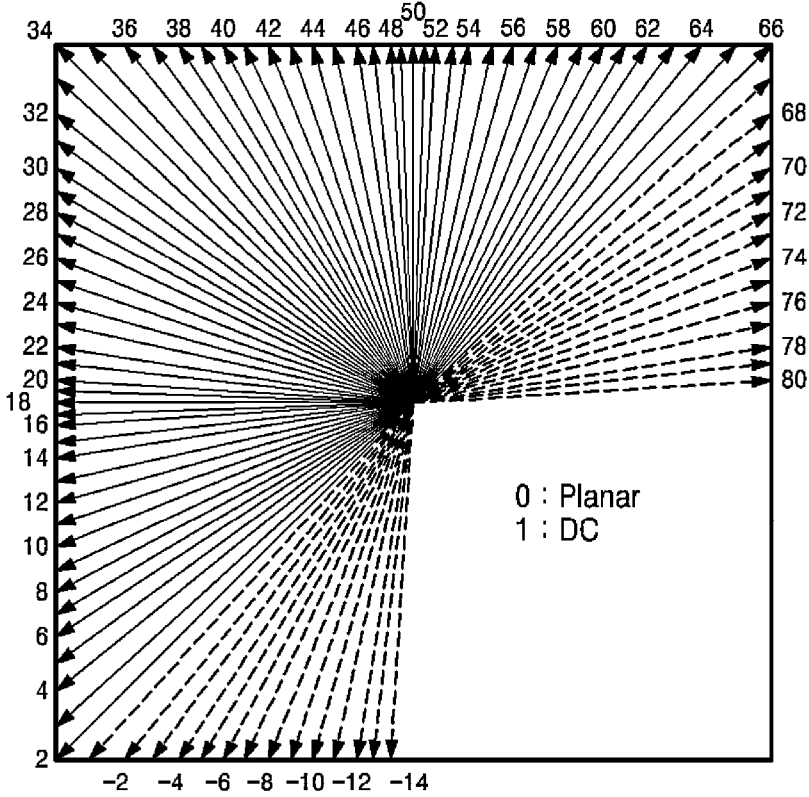

For efficient directional prediction for the current block having the rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and/or select an appropriate intra prediction mode to be used from tested modes. For example, the intra predictor 122 may calculate rate-distortion values by using a rate-distortion analysis for multiple tested intra prediction modes and/or select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In an embodiment, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. For example, sub-samples between two contiguous integer samples may be interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area may be signaled for each target area. For example, when the target area is the CU, the information on the motion vector resolution applied for each CU is signaled. The information on the motion vector resolution may be information representing precision of a motion vector difference to be described below.

The inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. The prediction block for the current block is generated by averaging or weighted-averaging the first reference block and the second reference block. Motion information including information on two reference pictures used for predicting the current block and information on two motion vectors is delivered to the entropy encoder 155. In an embodiment, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
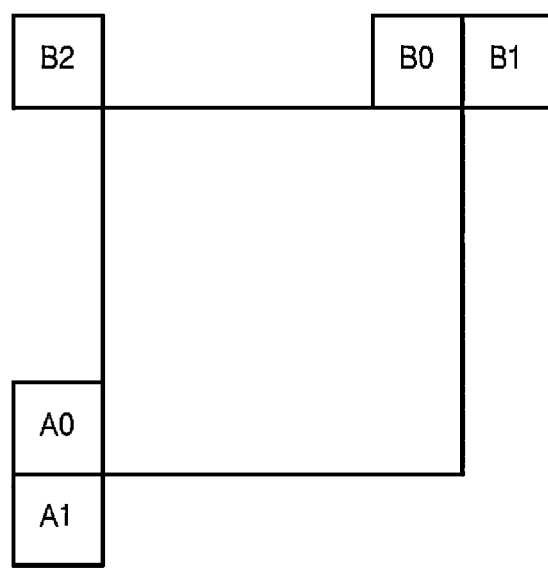
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting a residual signal. By using the merge skip mode, it is possible to achieve a relatively high encoding efficiency for images with slight motion, still images, screen content images, and the like.

Hereafter, the merge mode and the merge skip mode are collectively referred to as a merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. A motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

In an embodiment, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms a residual signal in a residual block having pixel values of a spatial domain into a transform coefficient of a frequency domain. The transformer 140 may transform residual signals in the residual block by using a total size of the residual block as a transform unit or also split the residual block into a plurality of subblocks and perform the transform by using the subblock as the transform unit. Alternatively, the residual block is divided into two subblocks, including a transform area and a non-transform area, to transform the residual signals by using only the transform area subblock as the transform unit. The transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

The transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may immediately quantize the related residual block without the transform for any block or frame. The quantizer 145 may apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may be used instead of the zig-zag scan. In an embodiment, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, etc.

The entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. The entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. The entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating a difference between the restored pixel and an original pixel, which occurs due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
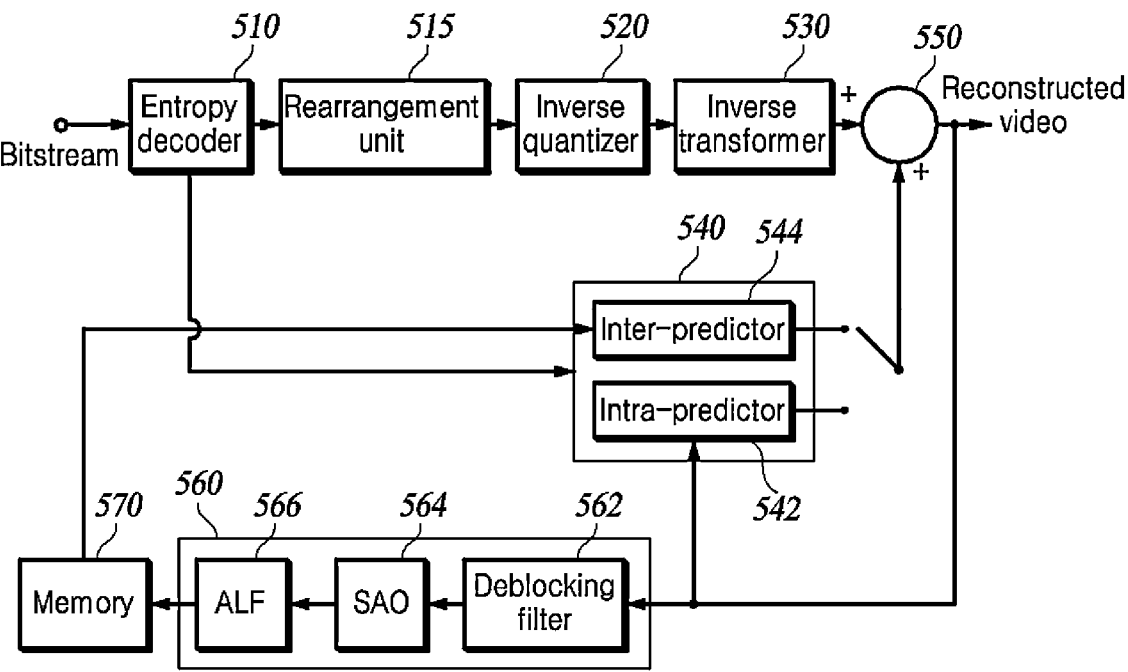
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and sub-components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. The CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (MTT_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or only QT splitting of multiple times may occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

When the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

The entropy decoder 510 extracts quantization related information, and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

When the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

When the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate a difference between the restored pixel and an original pixel, which occurs due to lossy coding. The filter coefficient of the ALF is determined by using information on a filter coefficient decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

Embodiments of the present disclosure relate to encoding and decoding of an image (video) described above. More specifically, embodiments of the present disclosure provide a video encoding/decoding apparatus and a method for deriving residual signals of a chroma component of a current block. In deriving the residual signals of the chroma component, the video encoding/decoding apparatus and method use the residual signals of a previously reconstructed block without transmitting residual signals of part of the chroma component of the current block.

The embodiment described below may be performed in the inverse transformer 165 of the video encoding apparatus and the inverse transformer 530 of the video decoding apparatus.

In the description below, a current block includes luma and chroma components, and the chroma component includes Cb and Cr signals. Therefore, the residual signals of the chroma component includes residual signals of the Cb and Cr signals.

The current block includes luma and chroma blocks. The chroma block includes Cb and Cr blocks. Therefore, the residual block of the chroma block includes Cb and Cr residual blocks. A residual block for encoding or decoding also exists for the luma block.

In the description below, values of samples constituting a residual block are collectively called residual signals. The expression of encoding/decoding a residual block may be used interchangeably with the expression of encoding/decoding residual signals depending on the situations.

I. Joint Coding of Chroma Residuals (JCCR)

In the VVC technology, the residual signals of Cb signals and the residual signals of Cr signals may be jointly encoded based on JCCR. JCCR may be performed per transform unit (TU) basis and activated by tu_joint_cbcr_residual_flag.

Depending on tu_joint_cbcr_residual_flag indicating JCCR, tu_cb_coded_flag indicating whether residual signals of Cb signals are transformed, and tu_cr_coded_flag indicating whether residual signals of Cr signals are transformed, the video decoding apparatus may set the variable TuCResMode for restoring residual signals of the chroma component as follows.

When tu_joint_cbcr_residual_flag=0, namely, when JCCR is not applied, TuCResMode is set to 0. Here, the video decoding apparatus decodes the residual signals of the Cb signals and the residual signals of the Cr signals separately.

When tu_joint_cbcr_residual_flag=1, namely, when JCCR is applied, TuCResMode may be set as follows.

When tu_cb_coded_flag=1 and tu_cr_coded_flag=0, TuCResMode is set to 1. When tu_cb_coded_flag=1 and tu_cr_coded_flag=1, TuCResMode is set to 2. When tu_cb_coded_flag=0 and tu_cr_coded_flag=1, TuCResMode is set to 3.

Depending on the variable TuCResMode, as shown in Table 1, the video decoding apparatus restores the residual signal resCb of the Cb signals and the residual signal resCr of the Cr signals.

TABLE 1

| TuCResMode | Reconstruction of Cb and Cr |
|---|---|
| 1 | resCb = resJointC<br>resCr = (CSign · resJointC) >> 1 |
| 2 | resCb = resJointC<br>resCr = (CSign · resJointC) |
| 3 | resCb = (CSign · resJointC) >> 1<br>resCr = resJointC |

In Table 1, resJointC is a joint chroma component decoded by the video decoding apparatus, and CSign has a value of 1 or −1, which the video encoding apparatus may transmit.

The three values of TuCResMode shown in Table 1 may be applied to the Intra frame (I-frame). Only the case in which TuCResMode=2 may be applied to the Predictive frame (P-frame) and the Bipredictive frame (B-frame).

The video encoding apparatus generates a joint chroma component resJointC as shown in Table 2 according to TuCResMode in order for the video decoding apparatus to decode the residual signals of the chroma component as shown in Table 1.

TABLE 2

| TuCResMode | Generation of resJointC |
|---|---|
| 1 | resJointC = (4 · resCb + 2 · CSign · resCr)/5 |
| 2 | resJointC = (resCb + CSign · resCr)/2 |
| 3 | resJointC = (4 · resCr + 2 · CSign · resCb)/5 |

II. Method Using Residual Signals of Previously Reconstructed Component

In the case of a component corresponding to the first decoding order among a plurality of components of a current block, the video decoding apparatus may generate a residual block of the first component by applying a bitstream transmitted by the video encoding apparatus to the entropy decoder 510, the dequantizer 520, and the inverse transformer 530. In an embodiment, this first component is the luma signals.

In the case of a component corresponding to the second or subsequent decoding order among a plurality of components of the current block, the video decoding apparatus may decode the residual signal derivation method index. In an embodiment, the components after the second component are chroma signals.

In the case of derivation method 1, in the same way as the method of generating the first luma component, the video decoding apparatus may reconstruct residual signals of the corresponding chroma component by applying a bitstream to the entropy decoder 510, the dequantizer 520, and the inverse transformer 530.

In the case of derivation method 2, the video decoding apparatus may derive a residual block of the chroma component of the current block by applying a linear model to the residual block of the reference component. The linear model parameters may include a weight for multiplication and an offset for addition.

Figure 6A:
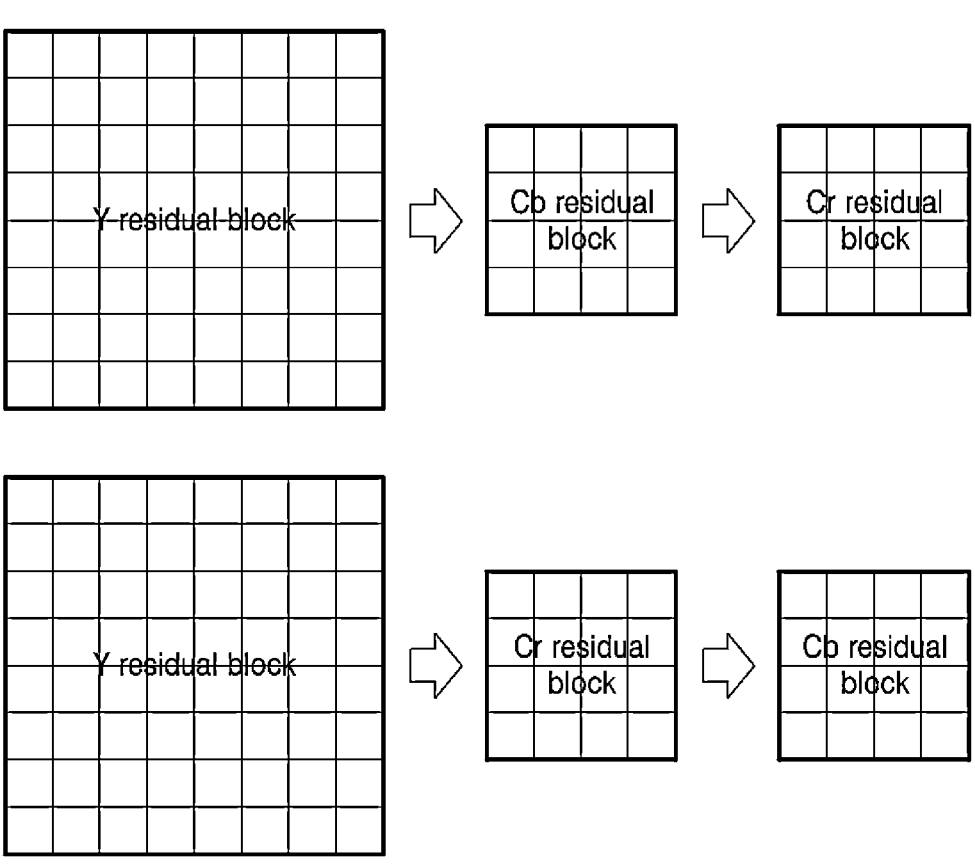
FIGS. 6A and 6B show residual blocks of reference components, according to an embodiment.
Figure 6B:
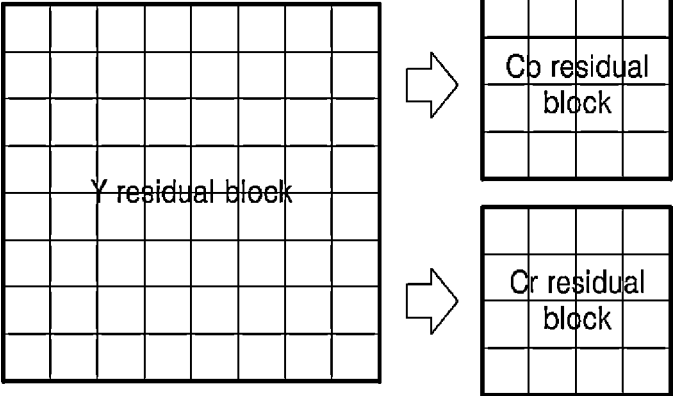

FIGS. 6A and 6B show residual blocks of reference components, according to an embodiment of the present disclosure.

As illustrated in FIG. 6A, the residual block of the Cb component of the current block may use the luma component as a reference component, and the residual block of the Cr component of the current block may use the Cb component as a reference component. As another example, a residual block of the Cr component of the current block may use the luma component as a reference component, and a residual block of the Cb component of the current block may use the Cr component as a reference component.

As shown in FIG. 6B, the luma component may be used as a reference component for both residual blocks of the Cb component and the Cr component of the current block.

The video decoding apparatus may decode weight and offset values from a bitstream.

As another example of the present disclosure, the video decoding apparatus may derive the weight and the offset. For example, the video decoding apparatus may decode an index of a list including a linear model composed of weight and offset and then derive the weight and offset values from, for example, a pre-stored lookup table using the decoded index.

As yet another example of the present disclosure, the video decoding apparatus may derive the weight and the offset as specific values.

As still another example of the present disclosure, the video decoding apparatus may derive the weight and the offset by calculating a linear relationship between residual values of reference samples adjacent to a reference component block and residual values of reference samples adjacent to a chroma block of a current block.

In the description below with reference to FIG. 7, an apparatus for reconstructing residual signals, that reconstructs a residual block of the chroma component of a current block from a residual block of a reference component using a derived linear relationship, is described.

A method for reconstructing chroma residual signals, performed by the apparatus for reconstructing residual signals according to the present embodiment, may be performed by the inverse transformer 530 of the video decoding apparatus.

Figure 7:
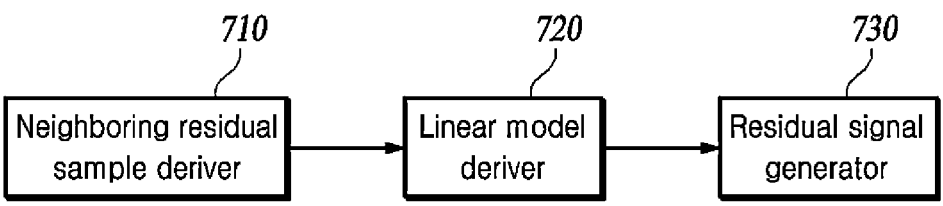
FIG. 7 is a block diagram conceptually illustrating an apparatus for reconstructing residual signals within a video decoding apparatus, according to an embodiment.

FIG. 7 is a block diagram conceptually illustrating an apparatus for reconstructing residual signals within a video decoding apparatus, according to an embodiment of the present disclosure.

An apparatus for reconstructing residual signals according to the present embodiment includes all or part of a neighboring residual sample deriver 710, a linear model deriver 720, and a residual signal generator 730.

The neighboring residual sample deriver 710 derives positions of neighboring residual samples of each of the chroma block of a current block (in what follows, it is referred to as a "current chroma block") and a decoded reference component block. The reference relationship between the current chroma block and the reference component block may be the same as shown in FIGS. 6A and 6B. In other words, both the current chroma block and the decoded reference component block may be components of the current block. The video encoding apparatus may encode information indicating the above reference relationship and transmit the encoded information to the video decoding apparatus. The entropy decoder 510 in the video decoding apparatus may decode the information indicating the reference relationship.

Because embodiments of the present disclosure aim at residual signals, in the description below, the current chroma block and the current chroma residual block may be used interchangeably, and the reference component block and the reference component residual block may also be used interchangeably.

Figure 8A:
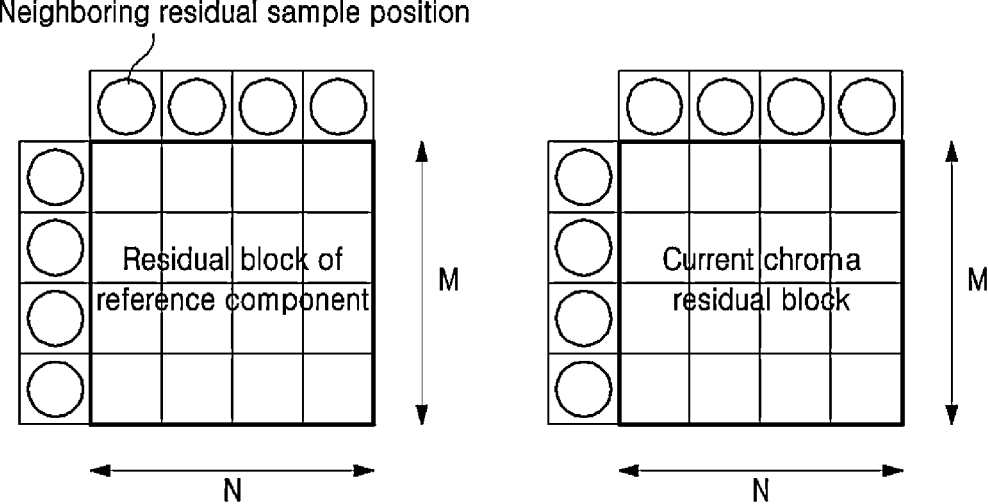

When the size of the current chroma block is the same as that of the reference component block, as illustrated in FIG. 8A, the neighboring residual sample deriver 710 may designate all or part of neighboring samples adjacent to the top or left of the current chroma block and the reference component block as neighboring residual samples. Examples of the above case may include the case in which a residual block of the Cr component of the current block uses a decoded Cb component as a reference component or the case in which a residual block of the Cb component of the current block uses a decoded Cr component as a reference component, as shown in FIG. 6A.

When the size of the current chroma block is smaller than that of the reference component block, the neighboring residual sample deriver 710 selects all n (where n is a natural number) neighboring samples adjacent to the top or left of the current chroma block as neighboring residual samples. Additionally or alternatively, the neighboring residual sample deriver 710 may select neighboring residual samples by subsampling n samples in the top or left portion of the reference component block.

When the width of a current chroma residual block is N (where N is a natural number) and the width of a residual block of the reference component is $\alpha \times N$ (where $\alpha$ is a natural number), as illustrated in FIG. 8B, for each non-overlapping area with a size of $a \times line\_num$ (where line_num is a natural number) in the top portion of the residual block of the reference component, the neighboring residual sample deriver 710 may select neighboring residual samples by sampling specific positions within the non-overlapping area.

When the height of a current chroma residual block is M (where M is a natural number) and the height of a residual block of the reference component is $\beta \times M$ (where (3 is a natural number), as illustrated in FIG. 8B, for each non-overlapping area with a size of $line\_num \times \beta$ in the left portion of the residual block of the reference component, the neighboring residual sample deriver 710 may select neighboring residual samples by sampling specific positions within the non-overlapping area.

As an example of the description above, in the examples of FIGS. 6A and 6B, a residual block of a chroma component of the current block may use a decoded luma component as a reference component.

The neighboring residual sample deriver 710 may select neighboring residual samples of the current chroma block and neighboring residual samples of the reference component block so that the selected neighboring residual samples form a one-to-one correspondence based on the sampled positions.

Figure 9A:
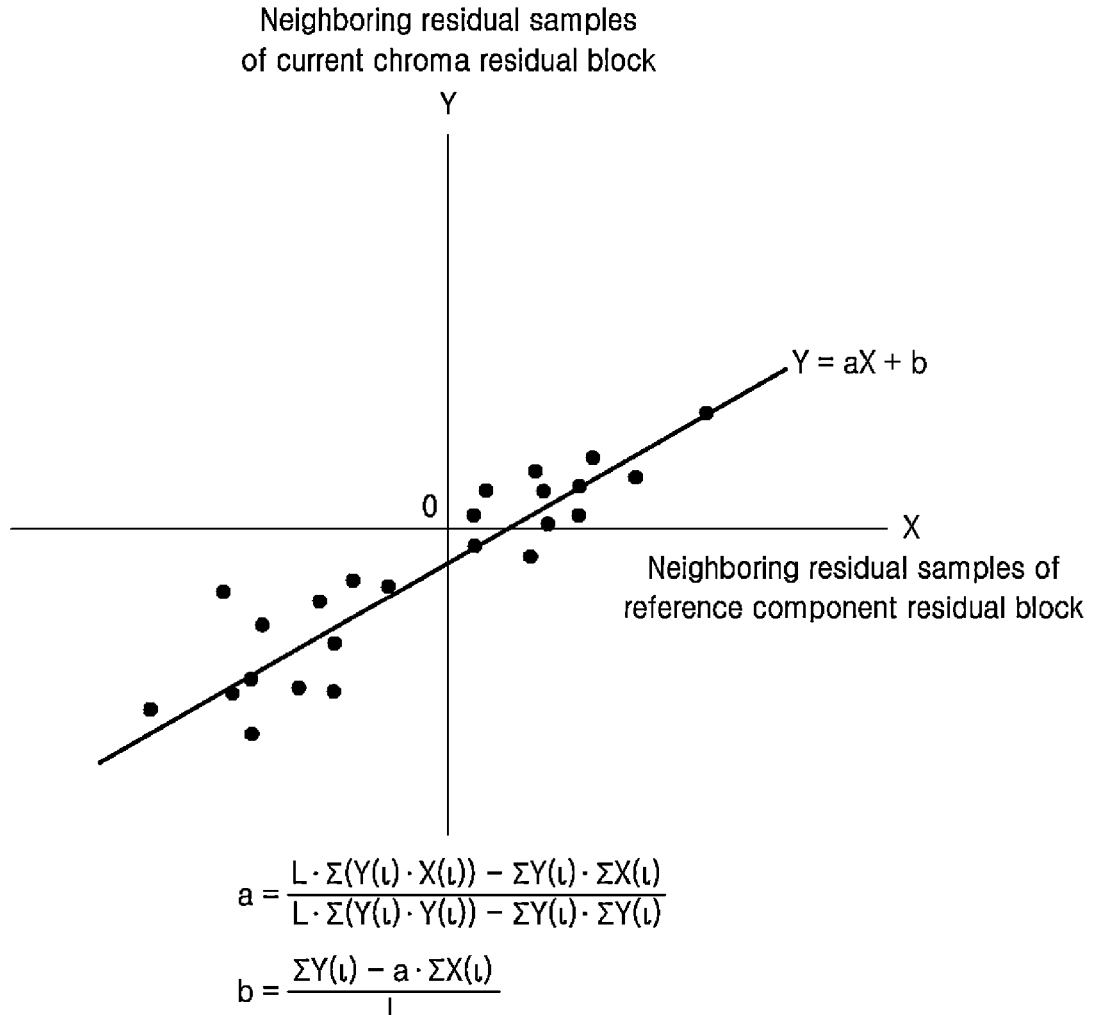
FIGS. 9A and 9B illustrate a linear relationship between neighboring residual samples of a current chroma block and neighboring residual samples of a reference component block, according to an embodiment.
Figure 9B:
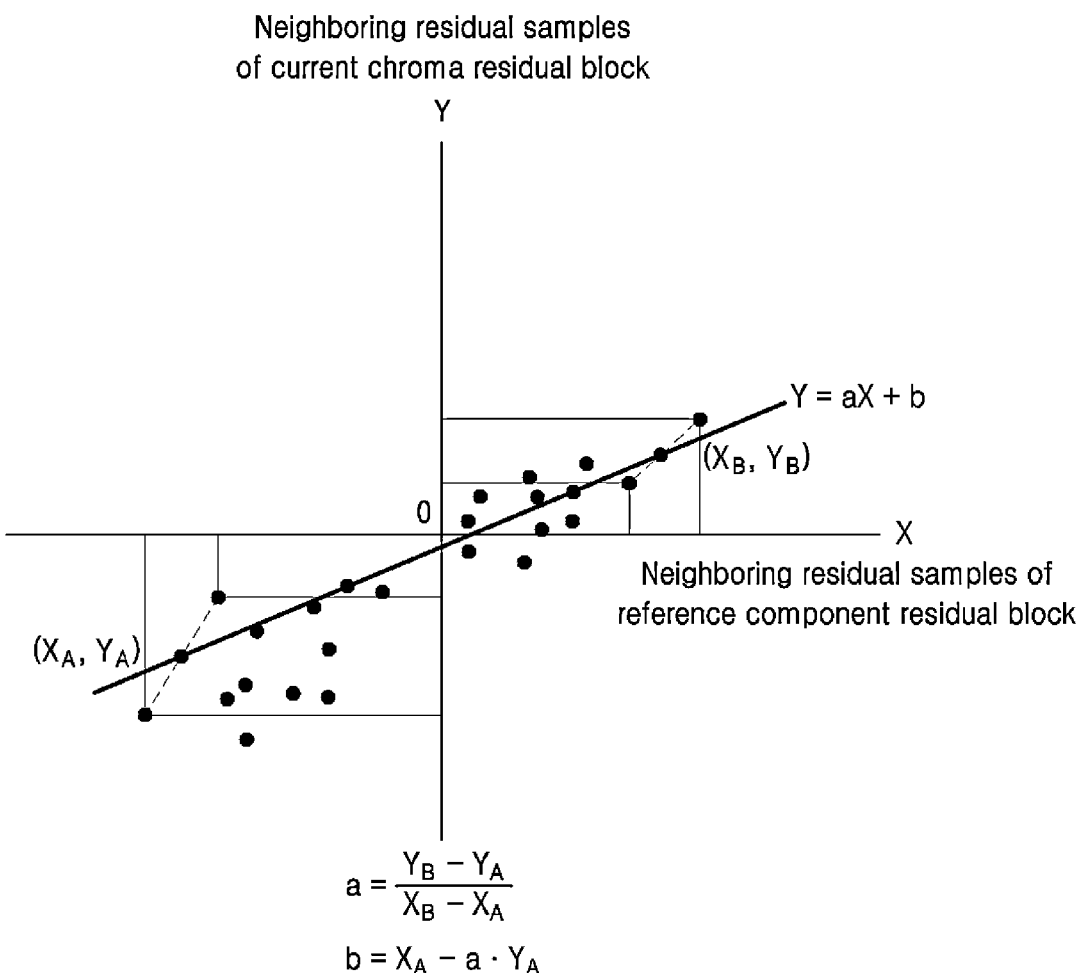

Based on the above one-to-one correspondence, as shown in FIGS. 9A and 9B, the linear model deriver 720 may derive a weight and an offset by estimating a linear relationship between the neighboring residual samples of the reference component block and the neighboring residual samples of the current chroma block.

The linear model deriver 720 may derive a linear relationship by applying the least square method to each set of L (where L is a natural number) neighboring residual samples taken from the reference component block and the current chroma block, respectively.

In another embodiment of the present disclosure, the linear model deriver 720 may derive the weight and the offset by selecting a pair of key neighboring residual samples and then calculating a linear relationship between the two key neighboring residual samples. The pair of key neighboring residual samples may be formed using the average of j (where j is a natural number) values having the smallest values and the largest k value (where k is a natural number) based on the neighboring residual sample values of the reference component block or the current chroma block.

The residual signal generator 530 may generate a residual block of the current chroma component by applying the linear relationship derived by the linear model deriver 720 to the residual block of a previously decoded reference component.

When the residual block of the previously decoded reference component has a different size from the current chroma residual block, the residual signal generator 530 may downsample the residual block of the previously decoded reference component to make the two residual blocks have the same size.

Figure 10A:
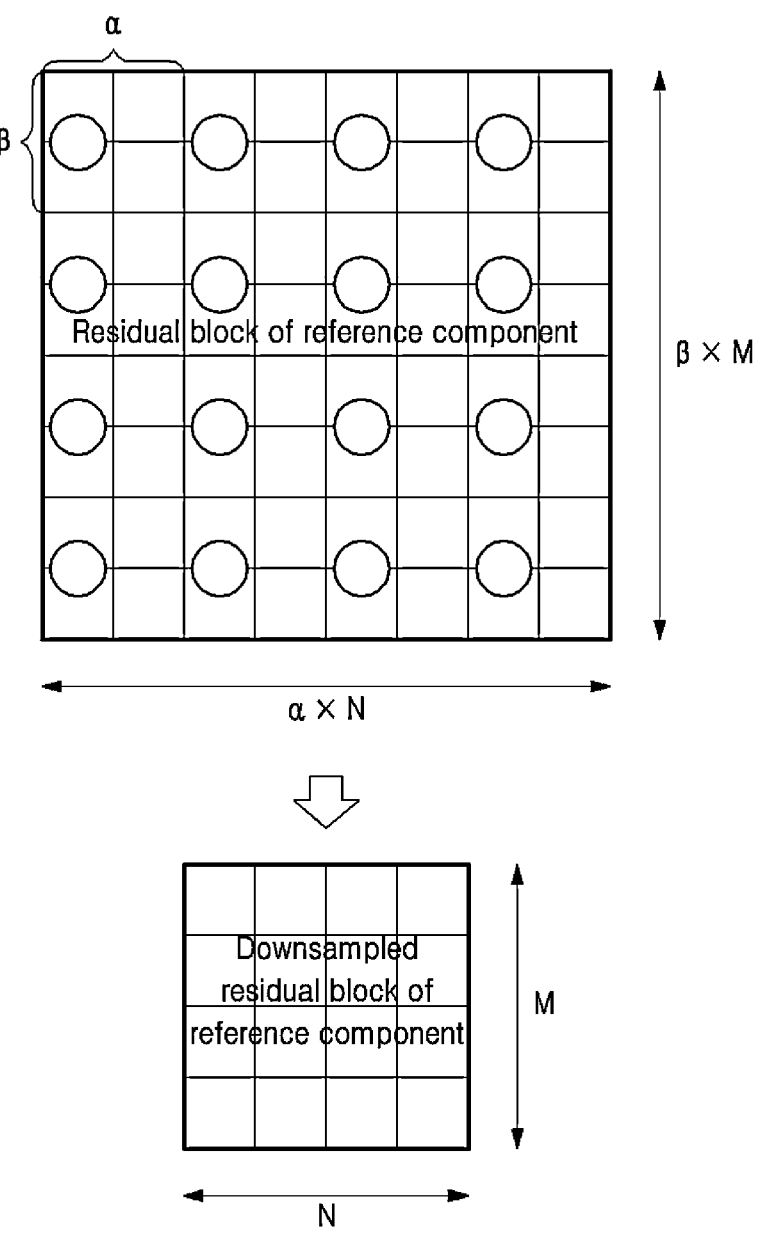
FIGS. 10A and 10B illustrate application of a derived linear relationship to a residual block of a reference component, according to an embodiment.

For example, as shown in FIG. 10A, when the width of the residual block of the reference component is a times the width of the current chroma residual block, and the height of the residual block of the reference component is β times the height of the width of the current chroma residual block, the residual signal generator 530 may generate reference samples by sampling specific positions within each non-overlapping region for each non-overlapping (α×β) region of the reference component residual block.

Figure 10B:
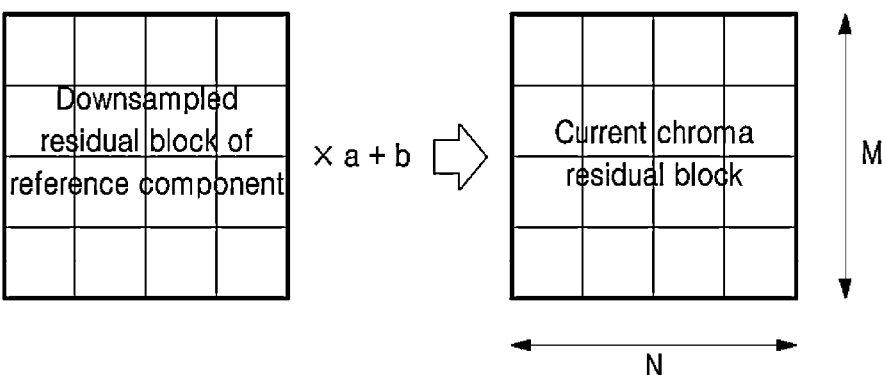

The residual signal generator 530 may generate a current chroma residual block by applying the derived linear relationship to the residual block of the reference component. As illustrated in FIG. 10B, the residual signal generator 530 may generate the current chroma residual block by multiplying each sample value in the residual block of the reference component by a weight and adding an offset to the weighted sample value.

FIG. 11 is a flow diagram illustrating a method for reconstructing chroma residual signals performed by a video decoding apparatus, according to an embodiment of the present disclosure.

The entropy decoder 510 within the video decoding apparatus decodes information representing a reference relationship between a chroma residual block and a reference component residual block within a current block (S1100). The reference relationship between the chroma residual block and the reference component residual block of the current block may be as shown in FIGS. 6A and 6B. As shown in FIGS. 6A and 6B, the video decoding apparatus may use a decoded residual block of the luma component or the chroma component as the reference component residual block within the current block.

The inverse transformer 530 within the video decoding apparatus derives the positions of first neighboring residual samples of a decoded reference component residual block and second neighboring residual samples of a chroma residual block based on the information representing the reference relationship (S1102).

The video decoding apparatus may select the first and second neighboring residual samples to maintain the one-to-one correspondence between the first and second neighboring residual samples.

When the sizes of the chroma residual block and the reference component residual block are the same, the video decoding apparatus selects all or part of the neighboring samples adjacent to the top or left of the chroma residual block as the second neighboring residual samples and selects all or part of the neighboring samples adjacent to the top or left of the reference component residual block as the first neighboring residual samples.

When the size of the chroma residual block is smaller than the reference component residual block, the video decoding apparatus may select all n neighboring samples adjacent to the top and left of the chroma residual block as the second neighboring residual samples and select the first neighboring residual samples by subsampling n samples in the upper and left portion of the reference residual block.

The video decoding apparatus generates a linear relationship between the first neighboring residual samples and the second neighboring residual samples based on the one-to-one correspondence (S1104).

The video decoding apparatus may derive a linear relationship by applying the least squares method to each set of L samples taken from the first and second adjacent residual samples, respectively.

After decoding the index of a list including a plurality of preset linear models, the video decoding apparatus may derive a linear relationship between the first neighboring residual samples and the second neighboring residual samples using the decoded index.

The video decoding apparatus generates a chroma residual block by applying the derived linear relationship to the residual block of the reference component (S1106).

When the size of the residual block of the reference component is different from that of the chroma residual block, the video decoding apparatus may downsample the residual block of the reference component to make the residual block of the reference component and the chroma residual block have the same size.

The method for reconstructing a chroma residual signal described above may also be performed by the inverse transformer 165 of the video decoding apparatus.

The video encoding apparatus searches for a decoded reference component residual block that is optimal in terms of reconstruction of a chroma residual block within a current block using rate-distortion analysis. During the search process, the video encoding apparatus generates information representing a reference relationship between the chroma residual block and the reference component residual block within the current block. The inverse transformer 165 in the video encoding apparatus may reconstruct the chroma residual block of the current block using the information representing the reference relationship.

The video encoding apparatus may encode information representing an optimal reference relationship generated in the search process and transmit the encoded information to the video decoding apparatus.

Figure 12:
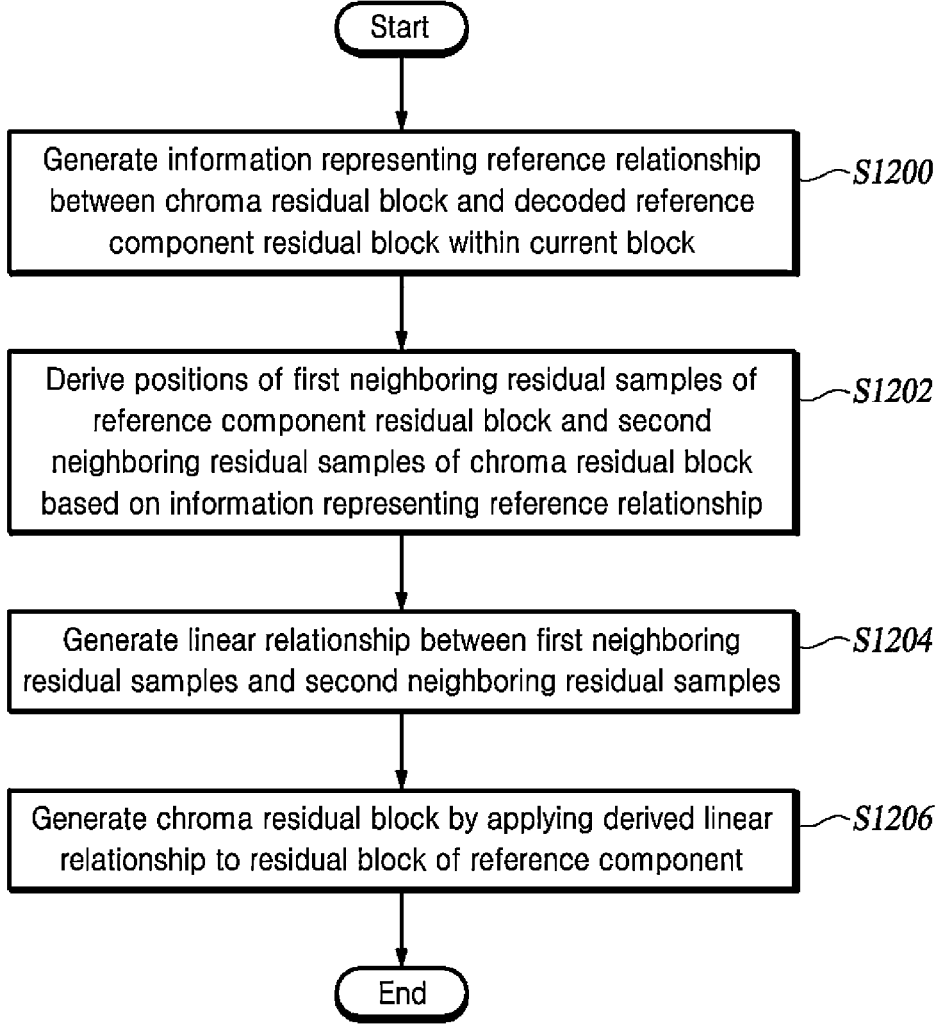
FIG. 12 is a flow diagram illustrating a method for reconstructing chroma residual signals performed by a video encoding apparatus, according to an embodiment.

FIG. 12 is a flow diagram illustrating a method for reconstructing chroma residual signals performed by a video encoding apparatus, according to an embodiment of the present disclosure.

The video encoding apparatus generates information representing a reference relationship between a chroma residual block and a decoded reference component residual block within a current block for bit rate-distortion analysis (S1200). The reference relationship between the chroma residual block and the reference component residual block of the current block may be as shown in FIGS. 6A and 6B. As illustrated in FIGS. 6A and 6B, the video encoding apparatus may use a residual block of a luma component or a chroma component as the residual block of the reference component within the current block.

The inverse transformer 165 in the video encoding apparatus derives the positions of the first neighboring residual samples of the reference component residual block and the second neighboring residual samples of the chroma residual block based on the information representing the reference relationship (S1202).

The video encoding apparatus may select the first and second neighboring residual samples to maintain a one-to-one correspondence between the first and second neighboring residual samples.

The video encoding apparatus generates a linear relationship between the first neighboring residual samples and the second neighboring residual samples based on the one-to-one correspondence (S1204).

The video encoding apparatus generates a chroma residual block by applying the derived linear relationship to the residual block of the reference component (S1206).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by ". . . unit" to strongly emphasize the possibility of their independent realization.

In some embodiments, various methods or functions described herein may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand the scope of the present disclosure is not to be limited by the above explicitly described embodiments but by the claims and equivalents thereof.

REFERENCE NUMERALS

510: entropy decoder
530: inverse transformer
710: neighboring residual sample deriver
720: linear model deriver
730: residual signal generator
What is claimed is:

1. A method for reconstructing a chroma residual block of a current block performed by a video decoding apparatus, the method comprising:
determining that a first chroma residual block of a current block for a first chroma component is not transmitted in a bitstream and the first chroma residual block is derived from a reference component residual block which is a previously decoded residual block of the current block for a reference color component, the reference color component being either a luma component or a second chroma component;
deriving positions of first neighboring residual samples of the first chroma residual block and second neighboring residual samples of the reference component residual block based on information representing a reference relationship between the first chroma residual block and the reference component residual block within the current block;
generating a linear relationship between the first neighboring residual samples and the second neighboring residual samples; and
reconstructing the first chroma residual block by applying the linear relationship to the reference component residual block without decoding residual signals for the first chroma residual block from the bitstream.

2. The method of claim 1, wherein deriving the positions comprises selecting the first neighboring residual samples and the second neighboring residual samples to maintain a one-to-one correspondence between the first neighboring residual samples and the second neighboring residual samples.

3. The method of claim 1, wherein, when the first chroma residual block and the reference component residual block have a same size, deriving the positions comprises:
selecting all or part of neighboring samples adjacent to the top or left of the first chroma residual block as the first neighboring residual samples, and
selecting all or part of neighboring samples adjacent to the top or left of the reference component residual block as the first second neighboring residual samples.

4. The method of claim 1, wherein, when a size of the first chroma residual block is smaller than a size of the reference component residual block, deriving the positions comprises:
selecting all n samples (where n is a natural number) adjacent to the top and left of the first chroma residual block as the first neighboring residual samples, and selecting n samples obtained by subsampling the top and left portion of the reference component residual block as the second neighboring residual samples.

5. The method of claim 1, wherein, when a width of the reference component residual block is $\alpha$ times a width of the first chroma residual block (where $\alpha$ is a natural number), deriving the positions comprises selecting the second neighboring residual samples obtained by sampling specific positions within each non-overlapping for each non-overlapping area with a size of $\alpha \times line_{num}$ (where line num is a natural number) in a top portion of the reference component residual block.

6. The method of claim 1, wherein, when a height of the reference component residual block is $\beta$ times the height of the first chroma residual block (where $\beta$ is a natural number), deriving the positions comprises selecting the second neighboring residual samples obtained by sampling specific positions within each non-overlapping area for each non-overlapping area with a size of $\beta \times line_{num}$ in a left portion of the reference component residual block.

7. The method of claim 1, wherein, when a size of the reference component residual block is different from a size of the first chroma residual block, generating the first chroma residual block comprises downsampling the reference component residual block to make the reference component residual block and the first chroma residual block have a same size.

8. A method for reconstructing a chroma residual block of a current block performed by a video encoding apparatus, the method comprising:
determining that a first chroma residual block of a current block for a first chroma component is not transmitted in a bitstream and the first chroma residual block is derived from a previously decoded residual block of the current block for a reference color component, the reference color component being either a luma component or a second chroma component;

generating information representing a reference relationship between the first chroma residual block and the reference component residual block within the current block;

deriving positions of first neighboring residual samples of the first chroma residual block and second neighboring residual samples of the reference component residual block based on the information representing the reference relationship;

generating a linear relationship between the first neighboring residual samples and the second neighboring residual samples; and reconstructing the first chroma residual block by applying the linear relationship to the reference component residual block.

9. The method of claim 8, wherein deriving the positions comprises using a residual block of a luma component or a chroma component as the reference component residual block within the current block.

10. The method of claim 8, wherein deriving the positions comprises selecting the first neighboring residual samples and the second neighboring residual samples to maintain a one-to-one correspondence between the first neighboring residual samples and the second neighboring residual samples.

11. A method for providing a video decoding apparatus with video data, wherein the method comprising:

encoding the video data into a bitstream; and transmitting the bitstream to the video decoding device, wherein encoding the video data includes:

determining that a first chroma residual block of a current block for a first chroma component is not transmitted in a bitstream and the first chroma residual block is derived from a previously decoded residual block of the current block for a reference color component, the reference color component being either a luma component or a second chroma component, generating information representing a reference relationship between the first chroma residual block and the reference component residual block within a current block, deriving positions of first neighboring residual samples of the first chroma residual block and second neighboring residual samples of the reference component residual block based on the information representing the reference relationship, generating a linear relationship between the first neighboring residual samples and the second neighboring residual samples, and reconstructing the first chroma residual block by applying the linear relationship to the reference component residual block.

* * * * *